United States Patent [19]

McKee

[11] Patent Number: 4,698,540

[45] Date of Patent: Oct. 6, 1987

[54] BRUSH ASSEMBLY FOR A HOMOPOLAR GENERATOR

[75] Inventor: Bobby D. McKee, San Jose, Calif.

[73] Assignee: Westinghouse Electric Corp., Pittsburgh, Pa.

[21] Appl. No.: 912,735

[22] Filed: Sep. 29, 1986

[51] Int. Cl.⁴ .......................................... H02K 13/00
[52] U.S. Cl. .................................. 310/239; 310/178; 310/242; 310/248
[58] Field of Search ............... 310/239, 240, 241, 242, 310/244, 245, 246, 247, 238, 219, 178, 248, 249

[56] References Cited

U.S. PATENT DOCUMENTS

| | | | |
|---|---|---|---|
| 3,271,605 | 9/1966 | Drabik | 310/246 |
| 3,308,321 | 3/1967 | Provost, Jr. | 310/239 |
| 3,735,172 | 5/1973 | Battaglia | 310/239 |
| 4,082,975 | 4/1978 | Azarov | 310/239 |
| 4,329,611 | 5/1982 | Ohmstedt | 310/245 |
| 4,355,254 | 10/1982 | Oki | 310/246 |
| 4,366,404 | 12/1982 | Ziegler | 310/245 |

FOREIGN PATENT DOCUMENTS

| | | | |
|---|---|---|---|
| 1216367 | 4/1980 | France | 310/239 |
| 0074340 | 6/1980 | Japan | 310/239 |

Primary Examiner—R. Skudy
Attorney, Agent, or Firm—R. P. Lenart

[57] ABSTRACT

A brush assembly for use in a homopolar dynamoelectric machine includes a plurality of contact elements extending into slots of a movable brush holder. Resilient tubular members extend through each of the brush holder slots and lie adjacent to the bottom of the slots. The brush holder is movable with respect to a brush box that includes an array of openings positioned to receive the contact elements. An actuating rod for moving the brush holder with respect to the brush box and projections, on opposite sides of each slot, for retaining the contact elements within the brush holder slots are also provided. When the brush holder is lowered such that the contact elements make sliding electrical contact with the surface of a rotating rotor of the homopolar machine, the resilient tubular members provide a spring force which keeps the contact elements in intimate sliding contact with the rotor surface.

5 Claims, 4 Drawing Figures

BRUSH ASSEMBLY FOR A HOMOPOLAR GENERATOR

STATEMENT OF GOVERNMENT INTEREST

The United States Government has rights in this invention pursuant to Contract No. F08635-84-C-0331 awarded by the Department of Defense.

BACKGROUND OF THE INVENTION

This invention relates to brush assemblies for dynamoelectric machines and more particularly to such assemblies for use in homopolar generators.

Homopolar generators have been successfully designed for providing short duration pulses having a peak current in excess of 1,000,000 amperes DC. Such generators generally include a cylindrical rotor of either a drum or disk configuration, mounted on a frame and rotated about a central axis. A field coil encircling the rotor and connected to an external current supply provides and applied magnetic field excitation passing through the rotor. The applied field excitation is usually confined and direction by a ferromagnetic stator structure surrounding the field coil and all, or a portion of, the rotor. When the rotor is spinning, free electrons within the rotor experience an electromotive force resulting from their interaction with the applied magnetic field excitation. Brushes, positioned adjacent to a current collection zone on the rotor, are then lowered onto the spinning rotor to allow an electrical current to flow under the influence of the electromotive force through return conductors to an external circuit, and then back onto the rotor through additional brushes at a different location. During the discharge, the interaction of the discharged current in the applied field creates a force which decelerates the rotor. It has been found, that extremely high current pulses may be obtained by using a relatively low power conventional prime mover or a conventional low voltage, low amperage power source to store initial energy in the rotor by gradually motoring the rotor up to the desired rotational speed.

Drum type homopolar dynamoelectric machines include a stationary excitation system and a rotating drum composed of a combination of ferromagnetic and highly conductive materials such that a direct current output voltage is produced along the axial length of the drum. These machines incorporate a set of current collecting brushes at axially displaced locations along the rotor's surface, which carry full load current. Homopolar dynamoelectric machines may operate as either a motor or a generator and are particularly suited to transfer energy in short, high current pulses to a storage inductor and a final load consisting of a resistive-inductive system. The rotor of drum type homopolar machines may include a cylindrical shell of a highly conductive, non-ferromagnetic material which generates and supports the full load current. This member is bonded or shrunk onto a ferrogagnetic inner cylindrical core which serves as the main rotor body and is directly attached to a drive or input shaft. Both components of the rotor are, preferably, homogeneous materials without segmentation or any combination of axial or circumferential grooves. Since modern current collectors may operate at a current density of between 10 and 15 kiloamps per square inch, it is imperative that the rotor surface near the two axial ends be smooth since this zone is used exclusively for current collection with, for example, solid metal graphite or fiber brushes. The machine's internal electromotive force is confined to an axial zone along the center of the rotor between the two outer current collection zones.

The rotor surface speed of a drum rotor in a high performance homopolar generator may exceed 100 meters per second and the generated current may exceed 1,000,000 amperes. Under these conditions, it is important that the current collecting brush members make intimate sliding contact with the rotor's surface. Prior art current collecting brush assemblies have included a plurality of contact members each having an individual pin and spring assembly which provided a spring force in a generally radial direction with respect to the rotor such that when the contact elements were lowered onto the rotor, the individual spring and pin assemblies forced the contact elements into sliding contact with the rotor. That brush configuration was relatively costly to manufacture, machine and assemble. In addition, the brushes were weakened by the required machining and therefore more susceptible to failure.

SUMMARY OF THE INVENTION

The present invention seeks to provide a brush assembly for a homopolar dynamoelectric machine which is relatively easy to manufacture and assemble, takes advantage of off the shelf parts, provides electrical insulation between the brush elements and brush holder, provides the necessary dynamic damping forces, and minimizes machining of the coantact elements to improve their strength characteristics.

A brush assembly constructed in accordance with this invention includes a plurality of contact elements and a brush holder having a plurality of slots for receiving a first end of each of the contact elements. Resilient tubular members extend longitudinally within each of the brush holder slots adjacent to the bottom of the slots. The brush elements extend from the brush holder into an array of openings in a brush box and means are provided for retaining the first end of the contact elements within the brush holder slots. The contact elements are brought into sliding mechanical and electrical contact with a spinning rotor of the homopolar machine by an actuator which moves the brush holder radially inward such that that contact elements extend through the array of openings in the brush box. The resilient tubular member provides the necessary radially directed force on the contact elements to maintain intimate sliding contact between these elements and the rotor surface.

DESCRIPTION OF THE PREFERRED EMBODIMENT

Figure 1:
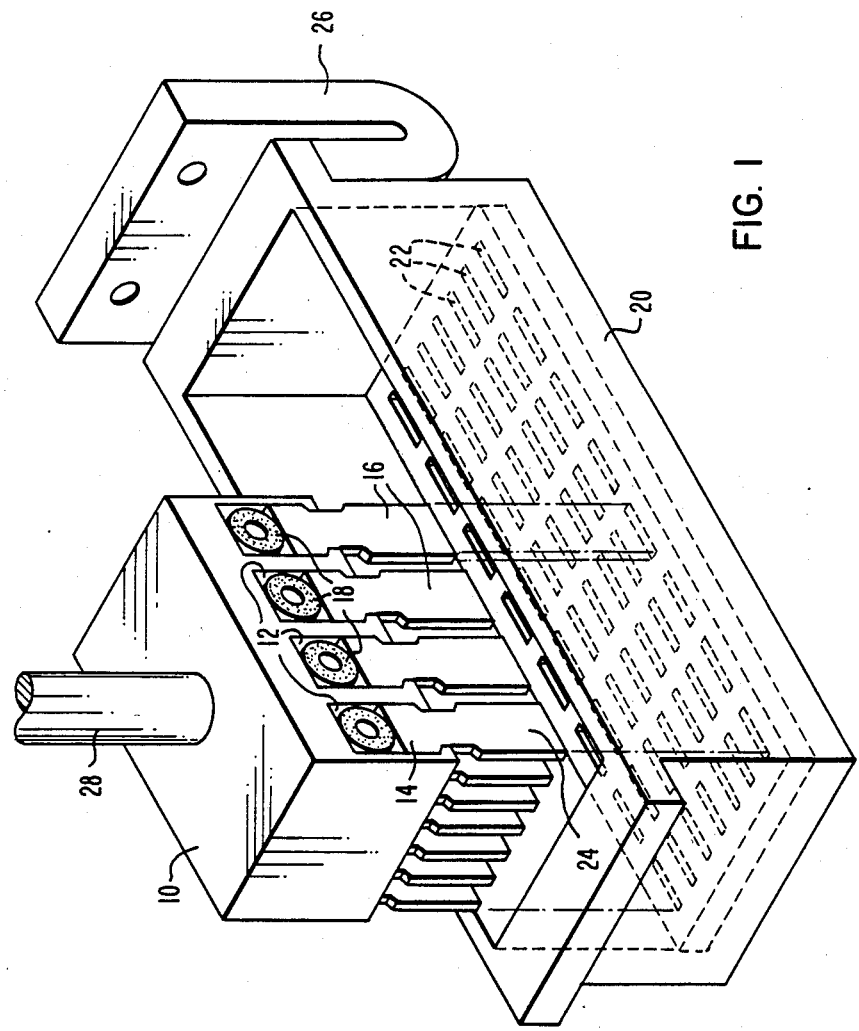
FIG. 1 is a pictorial representation of a brush assembly constructed in accordance with one embodiment of the present invention.

Referring to the drawings, FIG. 1 is a pictorial representation of a brush assembly constructed in accordance with one embodiment of the present invention. The brush assembly includes a brush holder 10 having a plurality of transverse slots 12 which receive first portions 14 of a plurality of contact elements 16. A resilient elastomeric tubular member 18 extends longitudinally within each of the slots 12 and lies adjacent to the bottom of each slot. A brush box 20 includes an array of openings 22 positioned to receive second portions 24 of the contact elements 16. A mounting bracket 26 in the form of a bus bar, is electrically connected to the brush box 20 and provides means for electrically connecting the brush box to an external circuit. Actuating rod 28 is connected between the brush holder 10 and a known brush actuator, not shown, which acts to move the brush holder 10 radially inward with respect to a rotor of the associated homopolar machine such that contact elements 16 extend through openings 22 and make sliding electrical contact with the rotor. It should be understood that brush box 20 is shown to be large enough to accommodate a second brush holder which would be adjacent to and identical to item 10.

Figure 2:
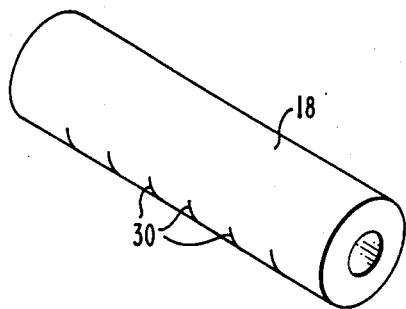
FIG. 2 is a perspective view of the resilient tubular member used in the brush assembly of FIG. 1.

FIG. 2 is a perspective view of one of the resilient tubular members 18 of the brush assembly of FIG. 1. This resilient tubular member, which in the preferred embodiment is a silicon rubber tube, includes a plurality of slits 30 which are positioned such that they lie between adjacent contact elements within each slot in the brush holder. These slits allow adjacent sections of the tubular member to deflect semi-independently so that contact elements 16 can conform to the rotor surface more easily. Tests on one type of silicone rubber tube, having an outside diameter of 0.45 inches and an inside diameter of 0.20 inches and meeting Military Specification ZZ-R-765, indicate that it shows near linear stiffness values of 40 to 50 pounds per inch in compression and 12 to 15 pounds per inch on expansion. These values compare favorably to prior art pin and spring assemblies which exhibited a stiffness of 30 to 50 pounds per inch.

Figure 3:
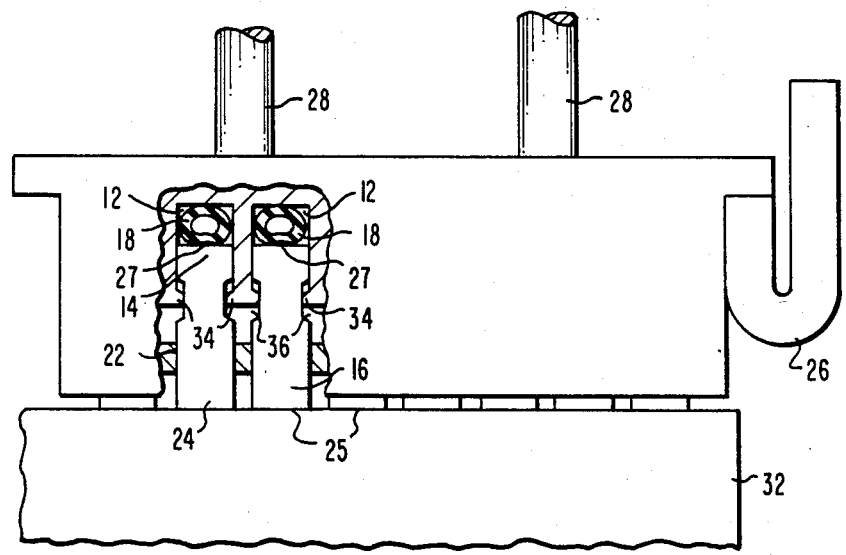
FIG. 3 is a side view, partially in section, of the brush assembly of FIG. 1.

FIG. 3 is a side view, partially in section, of the brush assembly of FIG. 1. In this view, two brush holders (identical to 10 in FIG. 1) have been lowered by means of actuating rods 28 such that the first ends 25 of contact elements 16 make sliding electrical contact with the surface of a rotor 32. In this position, the second ends 27 of contact elements 16 place the tubular member 18 in compression. A pair of projections 34 on opposite sides of each slot 12 extend into cutouts 36 on opposite sides of contact elements 16 and provide means for preventing movement of the contact elements out of the slots when the brush holder is lifted such that the tubular members 18 are no longer in compression.

Figure 4:
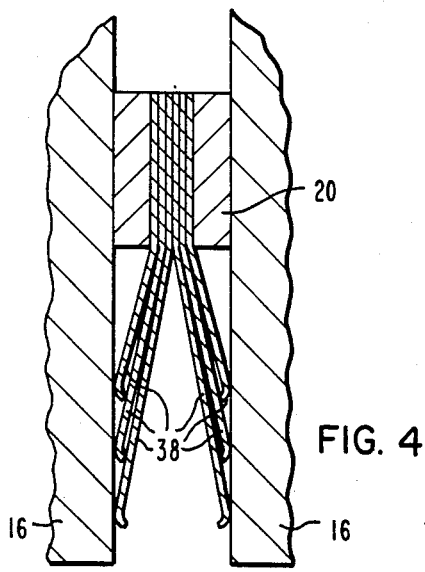
FIG. 4 is a cross section of a portion of the brush box and contact elements of the assembly of FIG. 1.

FIG. 4 is a cross section of two contact elements 16 and a portion of the brush box 20 lying between adjacent brush box openings. This portion of the brush box is seen to include a plurality of spring biased contact fingers 38 which make sliding electrical contact with the sides of contact elements 16. Therefore, electrical continuity is provided between the brush elements and the brush box by way of these spring biased fingers.

In the preferred embodiment of this invention, copper graphite brushes are used to construct the contact elements 16 and the brush box 20 and mounting bracket 26 are copper. Although the present invention has been described in terms of what is at present believed to be its preferred embodiment, it will be apparent to those skilled in the art that various changes may be made without departing from the scope of the invention. For example, the resilient tubular member may be made of the synthetic rubber sold under the trademark VITON, owned by E. I. du Pont & Co., or other material having similar resilient characteristics. It is therefore intended that the appended claims cover such changes.

What is claimed is:

1. A brush assembly for use in a dynamoelectric machine comprising:
    a plurality of contact elements;
    a brush holder having a plurality of slots for receiving a first portion of each of said contact elememnts;
    a plurality of resilient tubular members, one of said tubular members extending longitudinally within each of said slots and lying adjacent to a bottom of each of said slots;
    means for retaining said first portion of each of said contact elements within said brush holder slots;
    a brush box having an array of openings for receiving a second portion of each of said contact elements; and
    means for moving said brush holder with respect to said brush box thereby causing a first end of each of said contact elements to make sliding contact with a rotating member and causing each of said resilient tubular members to be radially compressed between a second end of each of said contact elements and one of said slot bottoms.

2. A brush assembly as recited in claim 1, wherein each of said tubular members includes a plurality of transverse slits, each of said slits being positioned between adjacent ones of said contact elements.

3. A brush assembly as recited in claim 1, wherein:
    said first portion of each of said contact elements is shaped to define opposing cutouts on opposite sides of each of said contact elements; and
    wherein said retaining means comprises a plurality of longitudinal projections extending from each side of said slots and extending into said cutouts on said contact elements.

4. A brush assembly as recited in claim 1, wherein each of said tubular members comprises a silicon rubber tube.

5. A brush assembly as recited in claim 1, further comprising:
    a plurality of spring biased finger elements rigidly attached to said brush box and making sliding electrical contact with said contact elements.

* * * * *